Jan. 5, 1954 C. R. CAMPBELL, JR 2,664,733
HIDE AND SKIN TENSIONING MACHINE EMPLOYING FEED ROLLS
Filed April 22, 1952
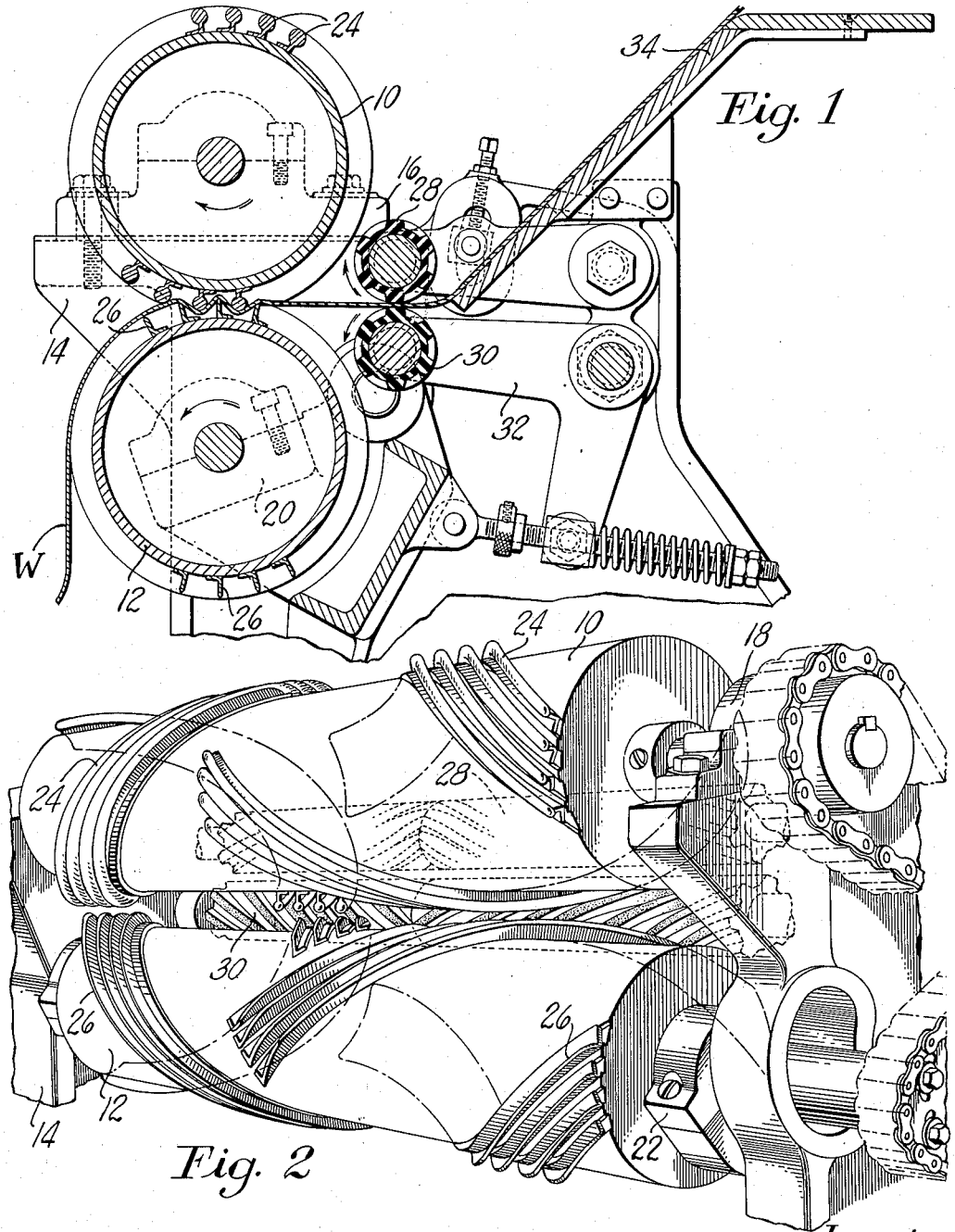
Inventor.
Charles R. Campbell, Jr.
By his Attorney Patented Jan. 5, 1954

2,664,733

UNITED STATES PATENT OFFICE 2,664,733

HIDE AND SKIN TENSIONING MACHINE EMPLOYING FEED ROLLS

Charles R. Campbell, Jr., Beverly, Mass., assignor to United Shoe Machinery Corporation, Flemington, N. J., a corporation of New Jersey Application April 22, 1952, Serial No. 283,736

7 Claims. (Cl. 69—34)

This invention relates to machines for treating hides, skins and leather and is herein illustrated as embodied in a work tensioning machine for performing staking operations on dry tanned hides and skins, although it will be understood that the invention may be useful in other types of tanning machinery.

The present application is a continuation-in-part of United States Letters Patent No. 2,646,676, granted July 28, 1953, upon an application filed in my name. The subject matter is also disclosed to a substantial extent in United States Letters Patent No. 2,596,125, granted May 13, 1952, in my name.

In tannery machines of the type disclosed in the patent applications above referred to, the work pieces of dry leather are consecutively presented through the bite of two feed rolls mounted on the in-feed side of two work treating rolls. The action of such machines is such that that portion of the work between the feed rolls and the work treating rolls is under considerable tension since the work rolls rotate at a faster rate than do the feed rolls. The spreading action of the work rolls is necessary in most types of tannery machines and is one factor which is highly effective to bring about desired staking action in machines of the type specifically referred to. It is important in such machines that the feed rolls present each work piece so that the latter is in no danger of being creased or folded. The work need not be stretched out or be perfectly flat as it is fed to the work rolls since, in staking, the work is obviously not flat because of the nature of the operation. Hides and skins are naturally far from being flat as they are taken from barrel-like bodies. In other words, undulations in the work during feeding are not objectionable unless they are so extensive as to cause the work rolls to crease the work. The nature of hides and skins as stated, together with the tension in the work which causes a certain amount of slippage of the side portions thereof through the feed rolls, do bring about a condition which is highly conducive to the formation of creases by the work rolls. Attempts to alleviate this condition, prior to the present invention, have not been successful, despite the substitution of various types of feed rolls.

It is an object of this invention to provide a machine in which improved feed rolls are employed in combination with work treating rolls requiring work to be fed thereto under tension and free of undulations so extensive as to cause creases.

For the purpose in view, there is provided in accordance with one feature of the invention a pair of rotary work rolls cooperatively arranged to tension, spread and treat a work piece fed between them and a pair of feed rolls mounted on the in-feed side of the work rolls with at least one of said feed rolls and preferably both of said feed rolls having helical ribs of resilient material for engaging and spreading the work. Another feature of the invention pertains to a helix angle for the ribs of one or both of the feed rolls being in the range of 50° to 80° or varying within that range.

The term "helix angle" in the present specification and claims is used to denote the angle followed by the ribs with respect to the circumference.

The features of the invention will now be further described in detail, reference being had to the accompanying drawings of a staking machine in which the invention is embodied.

In the drawings,

Fig. 1 is a vertical and sectional view through the principal working instrumentalities of a machine embodying the present invention; and Fig. 2 is a perspective and rear view of the assembled parts of the machine shown in Fig. 1.

The illustrated machine is identical with one of the machines forming the subject matter of Patent No. 2,646,676, referred to above. As the present invention relates only to the main operating instrumentalities of the machine, the entire machine is not described herein in detail.

In the illustrated machine a pair of rotary cooperative and bladed work treating rolls 10 and 12 are mounted on a machine frame 14. The upper roll 10 is journaled in fixed bearings 16 (Fig. 1) and 18 (Fig. 2). The lower roll 12 is mounted for swinging motion in movable bearings 20 (Fig. 1) and 22 (Fig. 2). Such mounting of the work rolls permits their opening and closing upon the work as is set forth in Patent No. 2,646,676. The upper roll 10 is provided with rounded ribs 24 which are mounted in groups and which are helically disposed to coact in interdigital non-contacting relation with sharp blades 26 mounted on the lower roll 12.

On the in-feed side of the work rolls 10 and 12 and contiguous thereto are mounted two cooperating feed rolls 28 and 30. The upper feed roll 28 is mounted in fixed position on the machine frame 14 in bearings not shown in the drawings. The lower feed roll 30 is mounted for swinging motion on the ends of two arms pivoted to the machine frame. One of these arms 32 is shown in Fig. 1.

The two feed rolls 28 and 30 are provided with coverings of resilient material such as rubber which material is bonded to the central steel cores of the rolls. The resilient material of each feed roll is preferably so formed as to present diverging helical ribs and the ribs of the roll 28 are so placed as normally to register with the ribs of the lower feed roll 30. The word "normally" is used herein to signify that in the absence of a work piece W the ribs come into substantial alinement (and do not mesh) at the bite of the rolls. It will be understood that the ribs of resilient material need not be integral with a cylindrical covering of such material on the roll or rolls as shown in the drawing. The ribs may take the form of strips of resilient material attached to the rolls or roll by a suitable adhesive or other means.

To aid the operator in presenting the work W (Fig. 1) to the machine an inclined and flat-topped table 34 is mounted on the front of the machine frame 14 and the lower edge of the table 34 is so placed as to terminate close up to the bite of the feed rolls 28 and 30.

It will be appreciated that in beginning the operation of the machine both the feed rolls and the work treating rolls are open for the introduction of a work piece down the inclined table 34. When the leading edge of the work piece is interposed between the open feed rolls 28 and 30 and assuming all four rolls are power rotated in the directions shown by the arrows in Fig. 1, the machine is treadled so that the feed rolls close upon the work first after which the work rolls 19 and 12 close upon the work and the work W is placed under tension in that zone between the sets of cooperating rolls. In the instant machine the first half of a given work piece W is treated and then the machine is opened and the work piece is reversed end for end and reintroduced to treat the remaining half thereof. It will be understood that the invention is not limited to use in the herein illustrated machine for the same combination of special feed rolls and work treating rolls to which the present invention relates may be utilized in a through-feed machine such as disclosed in United States Letters Patent No. 2,596,125, earlier referred to.

The drawings show a construction in which both feed rolls 28 and 30 are provided with helical ribs. Such construction is preferred but a very satisfactory construction, likewise employing the principles of the present invention, comprises the use of one feed roll (either upper or lower) employing helical ribs of resilient material and the cooperating feed roll employing a smooth or cylindrical surface without ribs and, preferably but not necessarily, of resilient material.

A very satisfactory helical angle for the resilient ribs, as found in actual practice, is 70° but this angle is not critical and may be constant or varied for a given roll but should not fall outside the range of 50° to 80° as above stated.

The following is given as an explanation or theory of the operation it being obvious that, if a very low helix angle were used, no work spreading action would occur and, if a high helix angle were used, end slip of the work would be encountered because of loss of contact therewith (large work contact per rib but no or little contact between ribs). The range of 50° to 80° helix angle is operative and successful for two major reasons:

(1) The ribs exhibit a "walking effect" and "step-over" the undulations while retaining control of the work. This changes the bagginess of the work into small undulations or waves between ribs and these small waves are carried to the edges of the stock by the sidewise advance of the contact points confining those waves.

(2) The ribs, being of considerable length and of resilient material, are distorted at their lines of contact with the work by the pull of the work rolls. This distortion is in a direction transverse perpendicular or 90° to each rib giving motion of the leather toward the edges of the stock.

From the above description it may be seen that excess undulations conducive to creasing are continuously prevented or wiped out by the resilient ribs of high helix angularity.

Having thus described my invention, what I claim as new and desire to secure by Letters Patent of the United States is:

1. In a machine for tensioning dry hides and skins, the combination of a pair of rotary work rolls cooperatively arranged to tension and spread a work piece fed between them, a pair of feed rolls mounted at one side of said work rolls cooperatively to retard the said work piece as fed to said work rolls, one of said feed rolls having oppositely extending helical ribs of resilient material and each of said ribs being transversely distortionable.

2. In a machine for tensioning dry hides and skins, the combination of a pair of rotary work rolls cooperatively arranged to flex and distort a work piece fed between them, a pair of contiguous feed rolls mounted on the in-feed side of said work rolls, at least one of said feed rolls having helical ribs of resilient material diverging toward the ends of said feed roll and each of said ribs being transversely distortionable.

3. In a machine for tensioning dry hides and skins, the combination of a pair of rotary work rolls cooperatively arranged to treat, tension and spread a work piece fed between them, a pair of feed rolls mounted at one side of said work rolls cooperatively to retard said work piece as fed to said work rolls, said feed rolls having normally registering helical ribs of resilient material for spreading the work and each of said ribs being transversely distortionable.

4. In a machine for tensioning dry hides and skins, the combination of a pair of rotary work rolls cooperatively arranged to treat, tension and spread a work piece fed between them, a pair of feed rolls mounted at one side of said work rolls cooperatively to retard the said work piece as fed to said work rolls, one of said feed rolls having oppositely extending helical ribs of resilient material for spreading the work and each of said ribs being transversely distortionable and having a helix angle in the range of 50° to 80°.

5. In a machine for tensioning dry hides and skins, the combination of a pair of rotary work rolls cooperatively arranged to flex and tension a work piece fed between them, a pair of contiguous power driven feed rolls mounted on the in-feed side of said work rolls, each of said feed rolls having helical ribs of resilient material diverging toward the ends of the said feed roll and each of said ribs being transversely distortionable and having a helix angle in the range of 50° to 80° with the ribs of one feed roll normally registering with the ribs of the other feed roll.

6. In a machine for tensioning dry hides and skins, a pair of cooperative work rolls each having one or more units of at least three similar helical and parallel blades arranged in peripherally spaced groups on both sides of an intermediate point in its length, the lead of each group on one side being opposite to that of a group on the other side, the blades on one work roll having blunt work engaging edges and being mounted in interdigital relation to the blades on the other work roll, the latter blades having relatively acute work engaging edges, and feed control means comprising a pair of helically ribbed feed rolls engageable adjacent to the bite of the work rolls with opposite sides of a work piece, each of the said feed rolls having its ribs extending with opposite leads from a point intermediate its length, and each of said ribs on the feed rolls being transversely distortionable.

7. In a machine for tensioning dry hides and skins, a pair of cooperative work rolls each having one or more units of at least three similar helical and parallel blades arranged in peripherally spaced groups on both sides of an intermediate point of its length, the lead of each group on one side being opposite to that of a group on the other side, the group blades on one work roll having blunt work engaging edges and being arranged to interdigitate with the group blades on the other work roll without contact, the latter blades having relatively acute work engaging edges, and feed control means comprising a pair of feed rolls engageable adjacent to the charging bite of the work rolls with opposite sides of a work piece, one of said feed rolls having helical ribs of resilient material diverging toward the ends of the said feed roll and each of said ribs being transversely distortionable and having a helix angle in the range of 50° to 80°.

CHARLES R. CAMPBELL, Jr.

References Cited in the file of this patent

UNITED STATES PATENTS

| Number | Name | Date |
|---|---|---|
| 587,717 | Evans | Aug. 10, 1897 |
| 592,952 | Evans | Nov. 2, 1897 |
| 975,628 | McKeen | Nov. 15, 1910 |
| 1,821,094 | Harding | Sept. 1, 1931 |
| 2,175,570 | Pierson | Oct. 10, 1939 |
| 2,504,917 | Amelunxen | Apr. 18, 1950 |